US009666877B2

(12) United States Patent
Serov et al.

(10) Patent No.: US 9,666,877 B2
(45) Date of Patent: May 30, 2017

(54) METAL-OXIDE CATALYSTS FOR FUEL CELLS

(71) Applicants: Alexey Serov, Albuquerque, NM (US); Ulises A Martinez, Albuquerque, NM (US); Plamen B Atanassov, Santa Fe, NM (US)

(72) Inventors: Alexey Serov, Albuquerque, NM (US); Ulises A Martinez, Albuquerque, NM (US); Plamen B Atanassov, Santa Fe, NM (US)

(73) Assignee: STC.UNM, Albuquerque, NM (US)

( * ) Notice: Subject to any disclaimer, the term of this patent is extended or adjusted under 35 U.S.C. 154(b) by 51 days.

(21) Appl. No.: 14/381,266

(22) PCT Filed: Mar. 11, 2013

(86) PCT No.: PCT/US2013/030151
§ 371 (c)(1),
(2) Date: Aug. 27, 2014

(87) PCT Pub. No.: WO2013/134759
PCT Pub. Date: Sep. 12, 2013

(65) Prior Publication Data
US 2015/0093686 A1 Apr. 2, 2015

Related U.S. Application Data

(60) Provisional application No. 61/608,718, filed on Mar. 9, 2012.

(51) Int. Cl.
*H01M 4/86* (2006.01)
*H01M 4/92* (2006.01)
(Continued)

(52) U.S. Cl.
CPC ............ *H01M 4/925* (2013.01); *B01J 23/40* (2013.01); *B01J 23/56* (2013.01); *B01J 23/62* (2013.01); *B01J 23/626* (2013.01); *B01J 23/6525* (2013.01); *B01J 23/8973* (2013.01); *B01J 25/00* (2013.01); *B01J 35/1061* (2013.01); *B01J 37/0018* (2013.01); *B01J 37/06* (2013.01); *B01J 37/16* (2013.01); *B01J 37/18* (2013.01); *B01J 37/343* (2013.01); *B01J 37/349* (2013.01); *H01M 4/8605* (2013.01); *H01M 4/8657* (2013.01); *H01M 4/9016* (2013.01); *H01M 4/92* (2013.01); *H01M 4/921* (2013.01); *B01J 35/0013* (2013.01); *B01J 35/0033* (2013.01)

(58) Field of Classification Search
None
See application file for complete search history.

(56) References Cited

U.S. PATENT DOCUMENTS 4,276,203 A 6/1981 Pfefferle
4,431,750 A 2/1984 McGinnis et al.
(Continued)

FOREIGN PATENT DOCUMENTS

WO 2011116055 A2 9/2011

*Primary Examiner* — Colin W Slifka
(74) *Attorney, Agent, or Firm* — Gonzales Patent Services; Ellen M. Gonzales

(57) ABSTRACT

A method of preparing catalytic materials comprising depositing platinum or non-platinum group metals, or alloys thereof on a porous oxide support.

15 Claims, 6 Drawing Sheets

(51) Int. Cl.
  *H01M 4/90* (2006.01)
  *B01J 37/06* (2006.01)
  *B01J 37/16* (2006.01)
  *B01J 37/18* (2006.01)
  *B01J 37/34* (2006.01)
  *B01J 23/62* (2006.01)
  *B01J 23/652* (2006.01)
  *B01J 23/89* (2006.01)
  *B01J 35/10* (2006.01)
  *B01J 23/40* (2006.01)
  *B01J 23/56* (2006.01)
  *B01J 25/00* (2006.01)
  *B01J 37/00* (2006.01)
  *B01J 35/00* (2006.01)

(56) References Cited

U.S. PATENT DOCUMENTS

| | | | |
|---|---|---|---|
| 2007/0259975 A1* | 11/2007 | Lee | B01J 23/75 |
| | | | 518/715 |
| 2008/0312073 A1 | 12/2008 | Olson et al. | |
| 2009/0069175 A1 | 3/2009 | Switzer et al. | |
| 2011/0311635 A1 | 12/2011 | Stucky et al. | |

* cited by examiner

METAL-OXIDE CATALYSTS FOR FUEL CELLS

CROSS-REFERENCE TO RELATED APPLICATIONS

The following application claims benefit of U.S. Provisional Application No. 61/608,718, filed Mar. 9, 2012, which is hereby incorporated by reference in its entirety.

BACKGROUND

Fuel cells are receiving increasing attention as a viable energy-alternative. In general, fuel cells convert electrochemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

As one example, Direct Methanol Fuel Cells (DMFCs) rely upon the oxidation of methanol on an electrocatalyst layer to form carbon dioxide. Water is consumed at the anode and produced at the cathode. Positive ions (H+) are transported across a proton exchange membrane to the cathode where they react with oxygen to produce water. Electrons can then be transported via an external circuit from anode to cathode providing power to external sources.

As another example, polymer electrolyte membrane (PEM) fuel cells (also called proton exchange membrane fuel cells) use pure hydrogen (typically supplied by a hydrogen tank) as a fuel. A stream of hydrogen is delivered to the anode side of a membrane-electrode assembly (MEA), where it is catalytically split into protons and electrons. As with the DMFC, the positive ions are transported across a proton exchange membrane to the cathode where they react with oxygen to produce water.

Currently, one of the limiting factors in the wide scale commercialization of PEM and DMFC fuel cells is the cost associated with precious metals. Both DMFC and PEM fuel cells commonly use platinum as an electrocatalyst. Nobel metals such as platinum are needed to catalyze the sluggish oxygen reduction reaction (ORR) at the cathode. One of the major routes to overcome this limitation is to increase the platinum utilization in noble-metal based electrocatalysts. Another viable route is to use a less expensive, yet still sufficiently active catalyst in larger quantities. Several classes of non-platinum electrocatalysts have been identified as having adequate oxygen reduction activity to be considered as potential electrocatalysts in commercial fuel cell applications.

Generally, known non-platinum electrocatalysts are supported on high surface area carbon blacks. This is done to increase dispersion, active surface area, and conductivity of the catalytic layer. The synthesis procedure usually includes precipitation of the precursor molecules onto the supporting substrate and pyrolyzation of the supported precursor.

Metal-Nitrogen-Carbon (M-N—C) catalysts have been found to be very promising for electrochemical oxygen reduction applications in fuel cell membrane electrode assemblies (MEAs), stacks and fuel cell systems. Critical aspects of these materials include the presence of metallic particles, conjugated carbon-nitrogen-oxide-metallic networks, and nitrogen-bonded carbon. The metallic phase includes metallic, oxide, carbide, nitride, and mixtures of these states. The chemical states and bonding of the N/C/M networks and N/C networks influences performance, for example, increased overall nitrogen content improves ORR performance. However, these systems still suffer from several significant drawbacks including: low stability in acidic environments, low durability in acid and alkaline environments, high costs of nitrogen precursors and low activity in ORR compared with platinum. The problem of low stability in acid is connected to leaching of metal from carbon-nitrogen network. Low durability in acid and alkaline solutions is explained by the evolution of significant amount of $H_2O_2$ in these environments which is corrosive for both metal and carbon-nitrogen networks. The low activity is possibly due to the low metal loading, and as a result in low concentration of active sites in such catalysts due to using external carbon source (high surface carbons like Vulcan, KetjenBlack etc). Accordingly, alternate catalysts and catalytic materials are still needed to make fuel cells a truly viable energy source.

SUMMARY

In the present disclosure a method for producing oxidative catalytic materials utilizing a sacrificial support approach and using inexpensive and readily available metal precursors is described.

DETAILED DESCRIPTION

Figure 1:
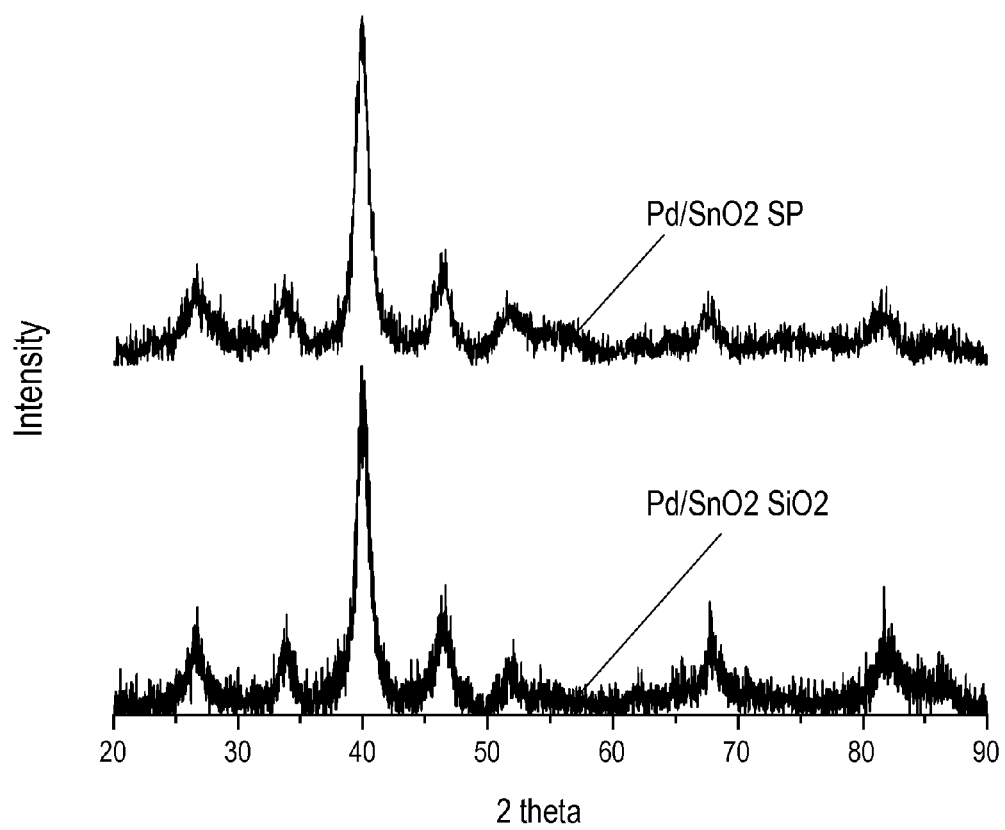
FIG. 1 is an X-ray diffractogram illustrating palladium deposited on the surface of tin oxide, where the tin oxide is prepared either by a silica templating method ($Pd/SnO_2$—$SiO_2$) or by spray pyrolysis ($Pd/SnO_2$—SP).

According to an embodiment the present disclosure provides novel catalysts and catalytic materials and methods for making the same. The present disclosure provides catalytic materials formed from the deposition of a noble metal or alloy thereof onto an oxide support. According to some embodiments, the oxide support acts as a co-catalyst, resulting in catalytic materials that can display catalytic activity up to 3× that of the same unsupported noble metal. This allows for the use of transition metal oxides, rare-earth metal oxides, and other metal oxides which are not traditionally used in catalytic materials due to their inherent lower catalytic activity.

For the sake of clarity, in the present application the term "catalyst" is used to refer to a final product, suitable for use, for example, in a fuel cell, which has catalytic activity. The catalyst may include multiple types of materials, some of which may not in themselves have catalytic activity (for example, supporting material.) The term "catalytic material" is any material which has catalytic activity either on its own or as part of a catalyst.

According to an embodiment of the present disclosure, platinum group metal (PGM), non-platinum group metals (non-PGMs), or alloys thereof are deposited onto an oxide support. Oxides are chemical compounds containing at least one oxygen atom and one other element in their chemical formulas. In general, because the oxide provides structural support for the noble metal(s), the oxide used is a solid oxide. According to some embodiments, the oxide may be a metal oxide. Metal oxides typically contain an anion of oxygen in the oxidation state of −2. Examples of suitable oxides include, but are not limited to, tin oxide ($SnO_2$), Molybdenum trioxide ($MoO_3$), Indium oxide ($In_2O_3$), Vanadium oxide ($V_2O_5$), Lead oxide ($PbO_2$), chromium oxide ($Cr_2O_3$), Manganese oxide ($MnO_2$), Iron oxide ($Fe_2O_3$), Cobalt oxide (CoO), Nickel oxide (NiO), Copper oxide (CuO), Zinc oxide (ZnO), silicon dioxide (or silica) ($SiO_2$), Bismuth oxide ($Bi_2O_3$), Tungsten oxide ($WO_3$), Ruthenium oxide ($RuO_2$), Titanium oxide (or titania) ($TiO_2$), zirconium dioxide (or zirconia) $ZrO_2$, Neodydium oxide ($NdO_3$), cerium oxide (or ceria) $CeO_2$, and lanthanum oxide ($La_2O_3$).

Because the oxide support is able to act as a co-catalyst, the specific oxide used in the presently described embodiments may be selected based on the intended use of the catalytic material (e.g. the specific catalytic reaction which the catalytic material is intended to catalyze, and/or the specific physical structure and/or physical or chemical requirements of the fuel cell in which the catalytic material is to be used. TABLE 1 below shows exemplary optimal oxide support/metal combinations for various catalytic reactions.

TABLE 1

Desirable oxide support/metal combinations for various catalytic reactions

| Fuel oxidized | Desirable oxide co-catalysts | Role of oxide co-catalysts |
| --- | --- | --- |
| C1 alcohol | $La_2O_3$, $Nd_2O_3$, $ZrO_2$, $TiO_2$, $RuO_2$, $CeO_2$ | Removal of poisoning species |
| C2 alcohols | $In_2O_3$, $SnO_2$, $PbO_2$, $Bi_2O_3$, $MoO_3$, $WO_3$ | Splitting of C-C bond |
| C3 alcohols | $Cr_2O_3$, $MnO_2$, $Fe_2O_3$, CoO, NiO, CuO, ZnO | Splitting of C-C bonds and removal of poisoning species |

The oxide support may be formed using any suitable method. According to a specific embodiment, the oxide support may be formed by spray pyrolysis. Spray pyrolysis is a known method for forming films and nanoparticles having a given size and known physical and chemical structure. See e.g., Martinez et al., "Aerosol-derived $Ni_{1-x}Zn_x$ electrocatalysts for direct hydrazine fuel cells", Phys. Chem. Chem. Phys. 14 (2012) 5512-5517 and Falase et al., "Electrooxidation of ethylene glycol and glycerol by platinum-based binary and ternary nano-structured catalysts", Electrochim Acta 66 (2012) 295-301.

In order to form a suitable oxide support using spray pyrolysis, metal precursors such as chlorides or nitrates are dissolved in solution, aerosolized, and carried through a furnace to form spherical oxide particle precursors which are further calcined under air to form the metal oxide materials.

According to yet another embodiment, the oxide supports may be formed using a sacrificial support-based methodology. In this embodiment, a sacrificial support, formed from a suitable material such as silica is provided. The sacrificial support is dispersed in solution and then mixed with the desired oxide precursor. The sacrificial support-oxide precursor mixture is calcined in air followed by the removal of the sacrificial support producing a porous oxide support having a specific, desired, morphology. The sacrificial support material is removed selectively without dissolution of oxides. For example, for base metal oxides (iron, nickel, manganese oxides etc.) 7M KOH is used as etchant. For noble-metal oxides (iridium, ruthenium oxides etc.) HF is used.

Suitable sacrificial supports include, but are not limited to silicas, zeolites, aluminas, and the like. The support may take the form of spheres, particles, or other two or three dimensional regular, irregular, or amorphous shapes. The spheres, particles, or other shapes may be monodisperse, or irregularly sized. The spheres, particles, or other shapes may or may not have pores and such pores may be of the same or different sizes and shapes.

It should be appreciated, and as described in greater detail below, the size and shape of the silica particles may be selected according to the desired shape(s) and size(s) of the voids within the resulting oxide material. Accordingly, by selecting the particular size and shape of silica particles, one can produce an oxide support having voids of a predictable size and shape. For example, if the silica particles are spheres, the oxide support will contain a plurality of spherical voids. Those of skill in the art will be familiar with the electrocatalyst Pt—Ru black, which consists of a plurality of platinum-ruthenium alloy spheres. An oxide support formed from using silica spheres with the above-described method looks like a negative image of the Pt—Ru black; the space that existed as a void in the Pt—Ru black is filled with the oxide material, and the space that existed as metal electrocatalyst in the Pt—Ru black is void.

As stated above, according to some embodiments, spheres having any desired diameter may be used as the sacrificial support. In some embodiments, particles having a characteristic lengths or diameters of between 1 nm and 10 mm may be used. In some preferred embodiments, particles having a characteristic length or diameter of between 1 nm and 100 nm, 1 nm and 25 nm, 5nm and 40 nm, 10 nm and 50 nm, 20 nm and 75 nm, 40 nm and 80 nm, 75 nm and 100 nm or any other suitable range may be used. In other preferred embodiments, particles having characteristic lengths or diameters of between 1 nm and 1000 nm, 50 nm and 500 nm, 75 nm and 750 nm or any other suitable range may be used. In other preferred embodiments, particles having characteristic lengths or diameters of between 100 nm and 1000 nm, 100 nm and 200nm, 150nm and 500nm, 250 and 750 nm or any other suitable range may be used. In other preferred embodiments, particles having lengths or diameters of between 1 mm and 10 mm, 1 mm and 2mm, 2 mm and 4 mm, 3 mm and 6 mm, 5 mm and 7 mm, 6 mm and 9 mm or any other suitable range may be used.

According to some embodiments, mesoporous sacrificial supports, such as mesoporous silica can also be used. In this case the mesoporous sacrificial support is template with the oxide material by intercalating the mesopores of the sacrificial material and typically results in a self-supported oxide material with a porosity in the 2-20 nm range. In one particular embodiment, the silica template is Cabosil amorphous fumed silica (325 m²/g). As stated above, because the spheres serve as the template for the formation of the oxide support, in an embodiment where silica particles having an average diameter of 20 nm is used, the spherical voids in the oxide support will typically have a diameter of approximately 20 nm. Those of skill in the art will be familiar with a variety of silica particles that are commercially available, and such particles may be used. Alternatively, known methods of forming silica particles may be employed in order to obtain particles of the desired shape and/or size.

As stated above PGM, non-PGM, or alloys thereof are then attached to or deposited onto the surface of the oxide support by chemical or thermal reduction. The method allows for the deposition of either PGM or non-PGM metals under similar conditions.

PGMs include ruthenium, rhodium, palladium, osmium, iridium, and platinum. Examples of suitable non-PGMs include 3-d block metals such as iron, nickel, cobalt, and copper as well as zinc. It will be appreciated that the methods disclosed herein are also suitable for use with alloys of the above, including binary and trinary alloys. Examples of suitable binary alloys include IrNi, NiRh, and PdRu. Examples of suitable trinary alloys include PdNiSn, IrCuZn, and PtCoIn.

According to an embodiment of the present disclosure, PGM or non-PGM metal soluble salts are used as the source of metal. Examples of PGM metal soluble salts include palladium nitrate, palladium acetate, iridium chloride, ruthenium chloride. Examples of non-PGM metal soluble salts include nickel nitrate, tin chloride, zinc acetate, copper nitrate.

According to a specific embodiment, the PGM, nonPGM, or alloys thereof deposited onto the oxide support are metal or metal alloys formed into particles that are sized on the order of nanometers. These particles may be formed by chemically or thermally reducing catalyst precursors and are then attached to the surface of the oxide support by nucleation and growth mechanisms.

As stated above, after deposition and/or impregnation of the PGM, nonPGM or metal precursors on the sacrificial support, the material is heat treated either in an inert atmosphere such as $N_2$, Ar, or He, etc., or in a reductive atmosphere such as hydrogen. In general, a reductive atmosphere may be preferred for non-PGM materials while either an inert or reductive atmosphere may be used for PGM materials.

According to some embodiment, the catalytic material can be heat treated to increase stability and durability. According to some embodiments, the optimal temperatures for heat treatment are typically between 150 and 500° C., depending on the materials being used.

According to some embodiments, the catalytic materials described herein can be deposited onto conductive dispersed supports (both carbon and non-carbon) in a fashion that facilitates the charge transfer of the heteroatom and the support. Examples of suitable conductive dispersed supports include carbon, and conductive carbides/ nitrides/borides/chalgonides, etc.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a catalyst" includes a plurality of such catalysts, and so forth.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

Additional information may be gathered from the drawings and Examples section below. The reaction tests shown and described in the drawings and in the following examples clearly demonstrate that catalysts prepared from Pd deposited on oxides possess high activity in alkaline media.

EXAMPLES

1. Synthesis of $Pd/SnO_2$—$SiO_2$ $Pd/SnO_2$—$SiO_2$ was prepared by the sacrificial support method. First, silica (surface area: ~400 m2g-1) was dispersed in water using an ultrasound bath. $SnCl_4$ was then added to the silica solution, followed by drying at 85° C. overnight. As obtained, dry $SnCl_4/SiO2$ composite material was calcined at 350° C. in air, resulting in the formation of $SnO/SiO_2$. Total loading of tin oxide on silica was calculated to be 20 wt. %. $Pd(NO_3)_2$ precursor was chemically reduced onto both oxides by using excess amount of $NaBH_4$ added drop-wise to the precursors-silica solution under constant ultrasonication. The resulting black slurry was aged for 2 h.

Figure 3:
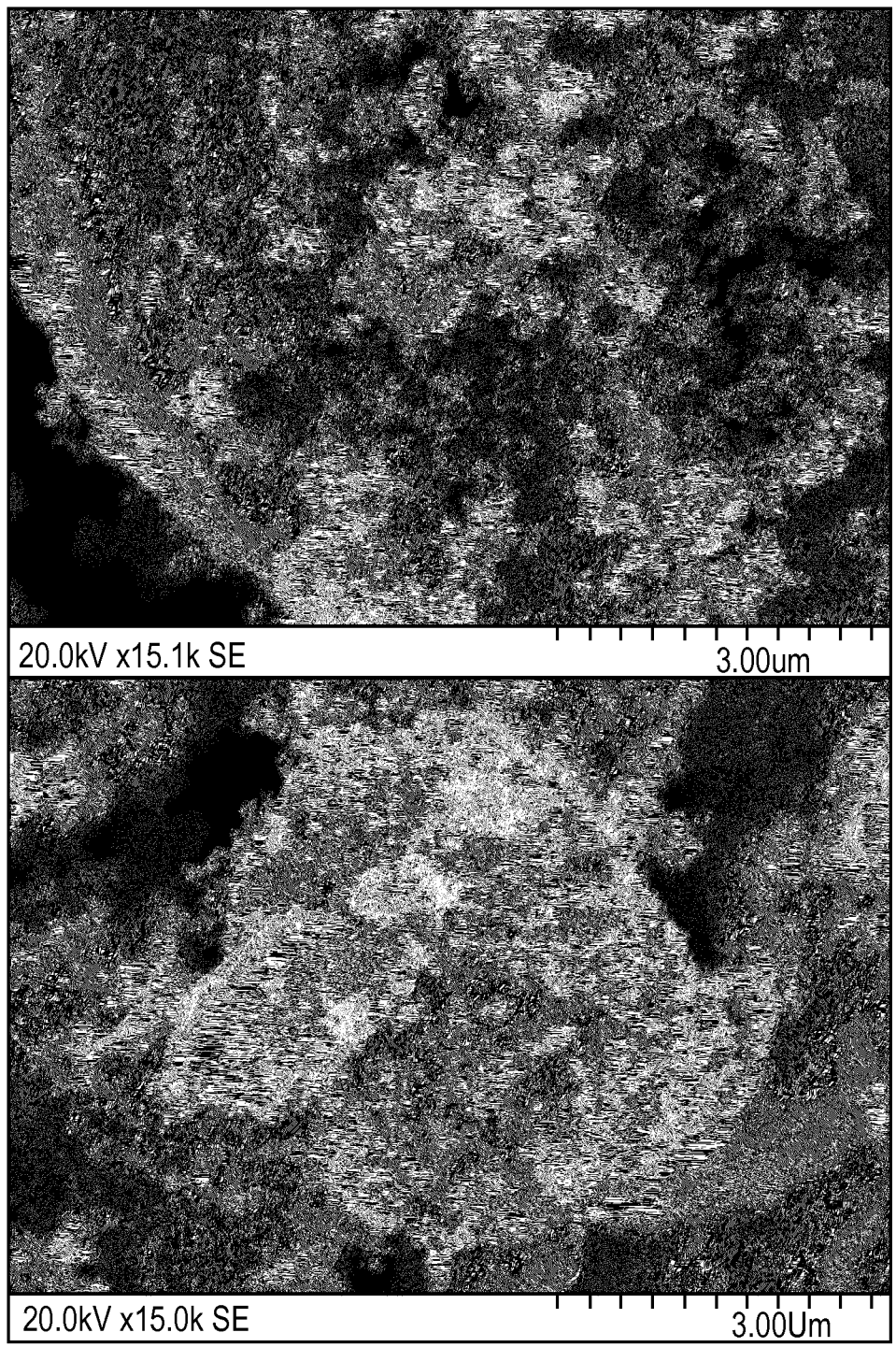
FIG. 3 is an SEM image of palladium deposited on surface of $SnO_2$ prepared by a silica templating method.

FIG. 1 is an X-ray diffractogram illustrating palladium deposited on the surface of tin oxide, where the tin oxide is prepared either by a silica templating method ($Pd/SnO_2$—$SiO_2$) or by spray pyrolysis ($Pd/SnO_2$—SP). FIG. 3 is an SEM image of palladium deposited on surface of $SnO_2$ prepared by a silica templating method.

2. Synthesis of Pd/$SnO_2$—SP

Pd/$SnO_2$—SP was prepared by using a $SnCl_4$ precursor dissolved in deionized water to a final concentration of 5 wt. %. The precursor solution was ultrasonically atomized and pyrolyzed using a quartz tube in a furnace operating at 500° C. using air (0.5 L/min) as the carrier gas. Pyrolyzed particles were air dried and collected on a Teflon filter. Collected oxide precursor was heat treated in air at 300° C. for 2 hours. Pd($NO_3$)$_2$ precursor was chemically reduced onto the $SnO_2$ by using excess amount of NaBH4 added drop-wise to the precursors-silica solution under constant ultrasonication. The resulting black slurry was aged for 2 h.

Figure 2:
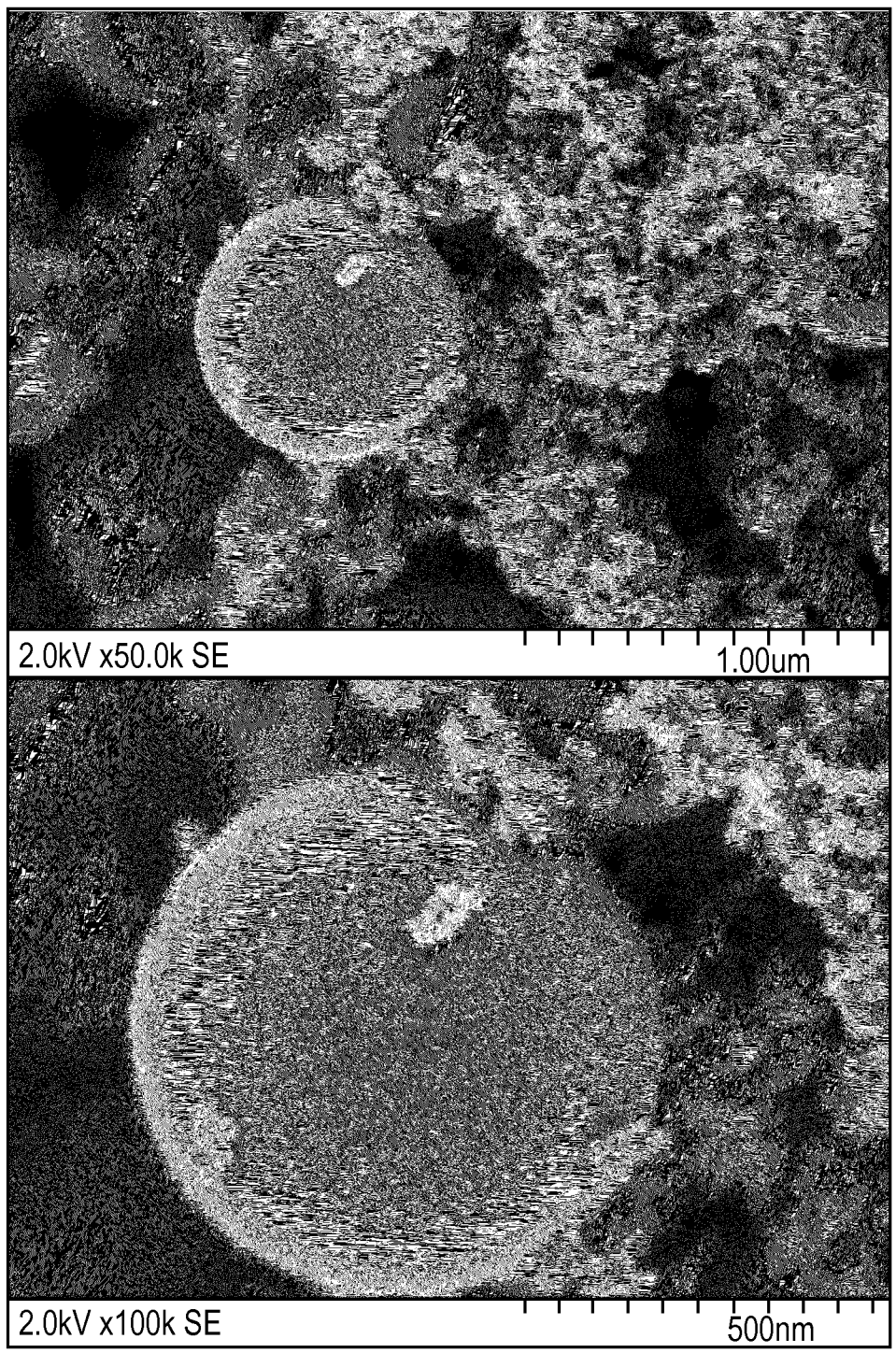
FIG. 2 is an SEM image of palladium deposited on surface of $SnO_2$ prepared by spray pyrolysis.

FIG. 1 is an X-ray diffractogram illustrating palladium deposited on the surface of tin oxide, where the tin oxide is prepared either by a silica templating method (Pd/$SnO_2$—$SiO_2$) or by spray pyrolysis (Pd/$SnO_2$—SP). FIG. 2 is an SEM image of palladium deposited on surface of $SnO_2$ prepared by spray pyrolysis.

3. Synthesis of Pd/$MoO_3$—$SiO_2$

Pd/$MoO_3$—$SiO_2$ was prepared by dispersing silica in water using an ultrasound bath. Ammonium molybdate was then added to the silica solution, followed by drying at 85° C. overnight. As obtained, dry ($NH_4$)$_2MoO_4$/$SiO_2$ composite material was calcined at 350° C. in air, resulting in the formation of $MoO_3$/$SiO_2$. Total loading of molybdenum oxide on silica was calculated to be 20 wt. %. Pd($NO_3$)$_2$ precursor was chemically reduced onto both oxides by using excess amount of $NaBH_4$ added drop-wise to the precursors-silica solution under constant ultrasonication. The resulting black slurry was aged for 2 h.

Figure 4:
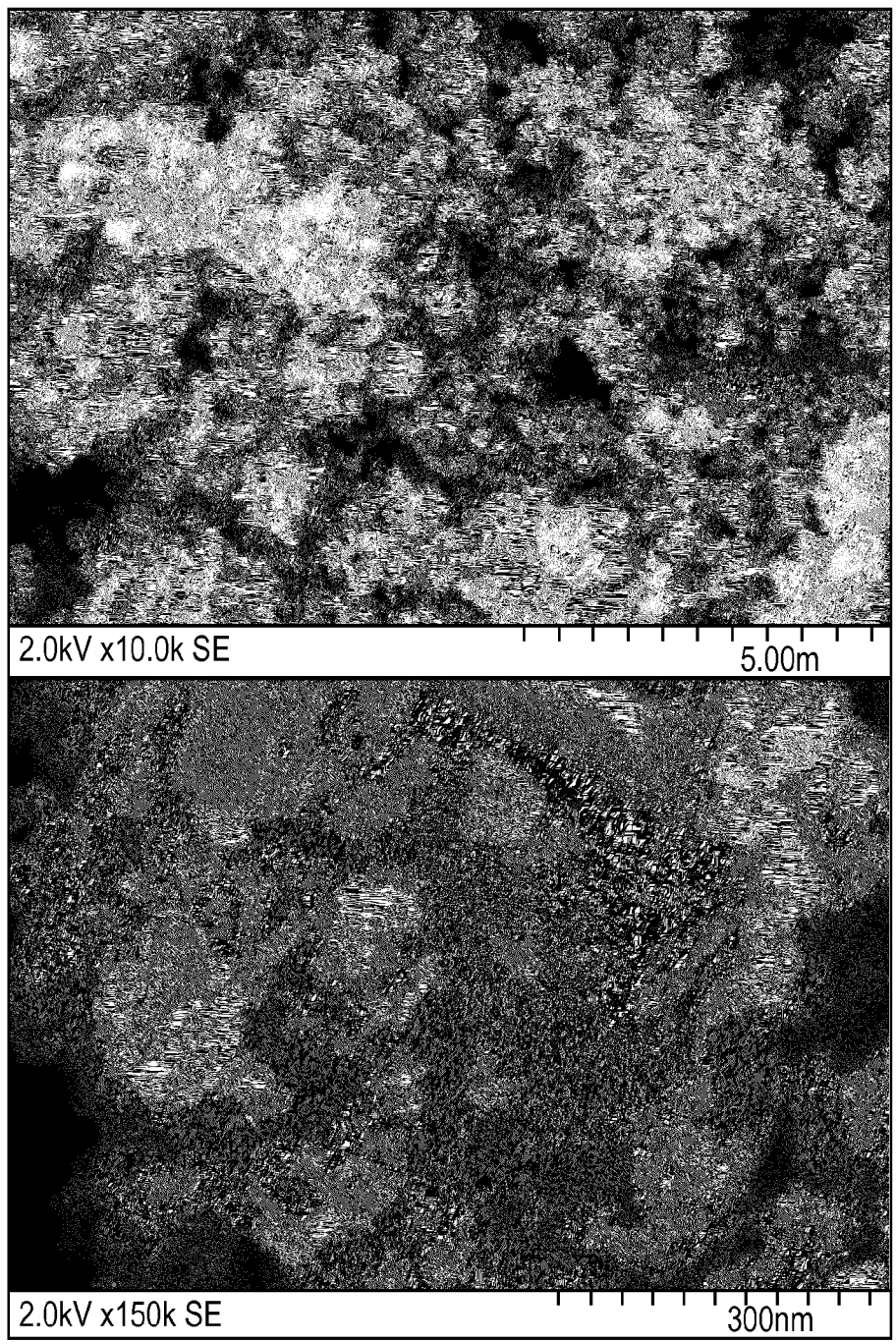
FIG. 4 is an SEM image of palladium deposited on the surface of $MoO_3$ prepared by a silica templating method.

FIG. 4 is an SEM image of palladium deposited on the surface of $MoO_3$ prepared by a silica templating method.

4. Synthesis of IrNi/$Sb_2O_3$

IrNi/$Sb_2O_3$ was prepared by dispersing antimony chloride in water. Silica was then added to the solution and dispersed using an ultrasonic bath. The $SbCl_3$/$SiO_2$ mixture is allowed to dry at 85° C. for 24 hours. Materials are ground and heat treated in air at 800° C. followed by the removal of silica in 9M KOH for 15 hours. High surface are oxide is then washed with DI water until neutral pH is obtained and then dried at 50° C. for 24 hours. ($NH_4$)$_2IrCl_6$ and Ni($HCO_2$) precursors were chemically reduced onto both oxides by using excess amount of $NaBH_4$ added drop-wise to the precursors-silica solution under constant ultrasonication. The resulting black slurry was treated under reducing hydrogen atmosphere for 2 h.

5. Synthesis of Pt/$In_2O_3$

Pt/$In_2O_3$ was synthesized by dissolving indium chloride tetrahydrate in water. Silica was then added to the solution and dispersed using ultrasound bath. Mixture was allowed to dry at 85° C. for 24 hours. As prepared dry composite materials is ground and heat treated at air at 450° C. The silica is removed by 6M KOH for 24 hours. As results high surface area oxide washed by DI water until neutral reaction and dried at 65° C. for 48 hours. Pt was added to the In2O3 by wet impregnation of $H_2PtCl_6$.

6. Results

Figure 5:
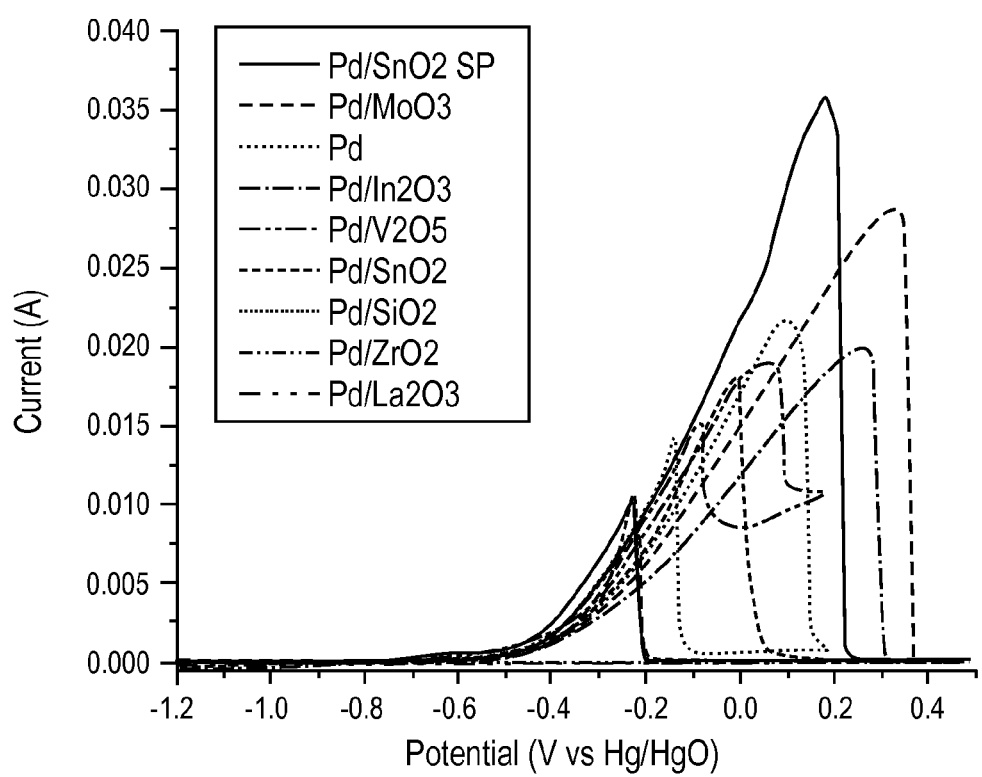
FIG. 5 is a Rotating Disc Electrode electro-voltamogram (RDE) illustrating EtOH oxidation on palladium deposited onto the surface of different oxides in 1M KOH+1M EtOH saturated with $N_2$ (loading 200 mg $cm^{-2}$, 1600 RPM, RT).

FIG. 5 is a Rotating Disc Electrode electro-voltammogram illustrating EtOH oxidation on palladium deposited onto the surface of a number of different oxides in 1M KOH+1M EtOH saturated with $N_2$ (loading 200 mg cm$^{-2}$, 1600 RPM, RT).

Figure 6:
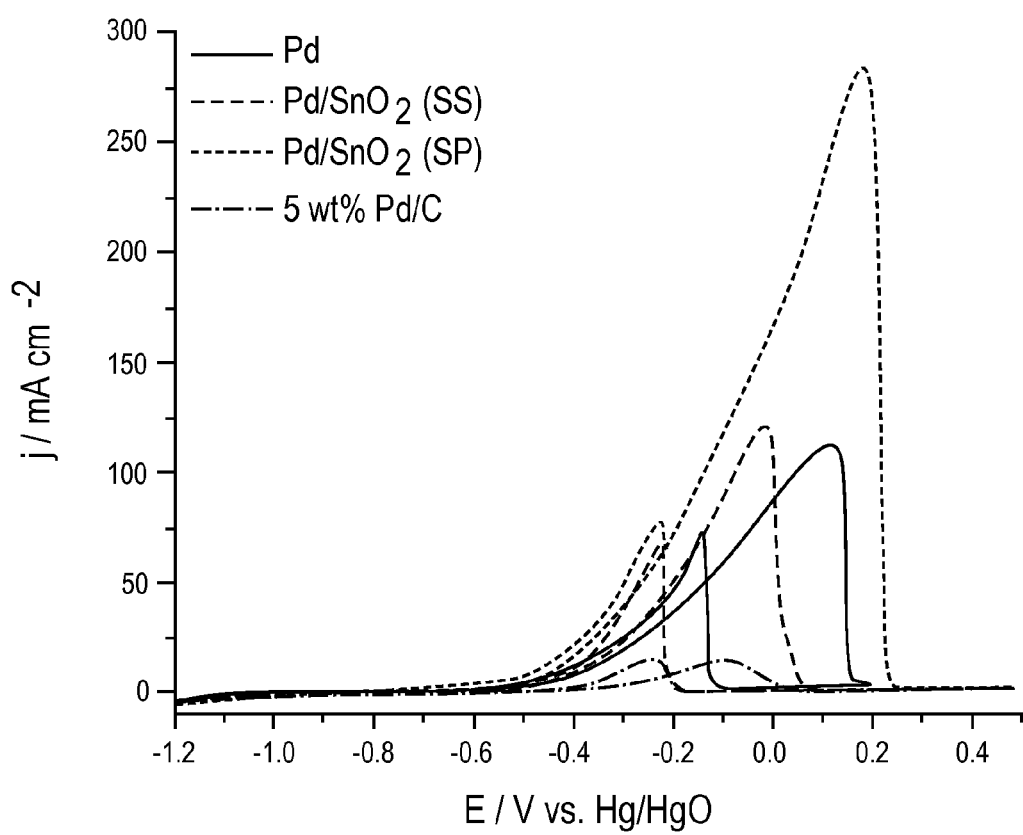
FIG. 6 is RDE data for EtOH oxidation on Pd deposited onto SnO2 synthesized via spray pyrolysis (SP) and sacrificial support (SS) methods in comparison with unsupported Pd and Pd supported on C at 5 weight percent loading. Reaction conditions are 1M KOH+1M EtOH saturated with $N_2$.

FIG. 6 is a Rotating Disc Electrode electro-voltammogram illustrating EtOH oxidation on palladium deposited onto the surface of $SnO_2$ synthesized via spray pyrolysis and sacrificial support methods in comparison with unsupported palladium and palladium supported on carbon at 5 weight percent loading. Reaction conditions are 1M KOH+1M EtOH saturated with $N_2$. From this data it can be seen that Pd/SnO2 catalysts formed using the methods described herein have an activity that is significantly higher than PD alone. Specifically, when comparing Pd with the same particle size (as in the case of pure Pd, Pd/SnO2(SP), and Pd/SnO2(SS)) the addition of SP or SSM-formed oxides improves the catalytic performance up to three times.

What is claimed is:

1. A method for forming a catalytic material comprising:
   mixing an oxide precursor with sacrificial template particles to produce dispersed oxide-precursor composite particles;
   calcining the dispersed oxide-precursor to convert the oxide-precursor to oxide, producing an oxide composite material having an irregular external surface morphology;
   selectively removing the sacrificial template particles without dissolution of the oxide so as to produce a porous oxide support; and
   attaching or depositing a platinum group metal, non-platinum group metal, or alloy thereof to the surface of the porous oxide support.

2. The method of claim 1 wherein the oxide is selected from the group consisting of: tin oxide ($SnO_2$), Molybdenum trioxide ($MoO_3$), Indium oxide ($In_2O_3$), Vanadium oxide ($V_2O_5$), Lead oxide ($PbO_2$), chromium oxide ($Cr_2O_3$), Manganese oxide ($MnO_2$), Iron oxide ($Fe_2O_3$), Cobalt oxide (CoO), Nickel oxide (NiO), Copper oxide (CuO), Zinc oxide (ZnO), silicon dioxide (or silica) ($SiO_2$), Bismuth oxide ($Bi_2O_3$), Tungsten oxide ($WO_3$), Ruthenium oxide ($RuO_2$), Titanium oxide (or titania) ($TiO_2$), zirconium dioxide (or zirconia) $ZrO_2$, Neodydium oxide ($NdO_3$), cerium oxide (or ceria) $CeO_2$, and lanthanum oxide ($La_2O_3$).

3. The method of claim 1 wherein the oxide is selected from the group consisting of: tin oxide ($SnO_2$), Molybdenum trioxide ($MoO_3$), and Indium oxide ($In_2O_3$).

4. The method of claim 1 wherein a platinum group metal is attached or deposited on the porous oxide support, and wherein the platinum group metal is selected from the group consisting of: ruthenium, rhodium, palladium, osmium, iridium, and platinum and alloys thereof.

5. The method of claim 1 wherein a platinum group metal is attached or deposited on the porous oxide support, and wherein the platinum group metal is palladium or an alloy of palladium.

6. The method of claim 5 wherein the oxide is selected from the group consisting of: tin oxide ($SnO_2$), Molybdenum trioxide ($MoO_3$), and Indium oxide ($In_2O_3$).

7. The method of claim 1 wherein attaching a platinum group metal, non-platinum group metal, or alloy thereof to porous oxide support comprises chemically or thermally reducing a precursor of the platinum group metal, non-platinum group metal, or alloy thereof onto the surface of the porous oxide support and then heat treating the support.

8. The method of claim 7 wherein a platinum group metal or alloy thereof is attached to the porous oxide support and wherein the support is heat treated in a reductive atmosphere.

9. The method of claim 7 wherein a non-platinum group metal or alloy thereof is attached to the porous oxide support and wherein the support is heat treated in an inert atmosphere.

10. The method of claim 1 wherein removal of the sacrificial template particles results in a porous oxide support having an irregular internal morphology.

11. The method of claim 1 wherein removal of the sacrificial template particles results in a porous oxide support that is weakly structured.

12. The method of claim 1 wherein removal of the sacrificial template particles results in an amorphous porous oxide support.

13. The method of claim 1 wherein the sacrificial template particles are amorphous.

14. A method for forming a catalytic material comprising:
mixing an oxide precursor with a plurality of sacrificial template particles to produce dispersed oxide-precursor composite particles;
calcining the dispersed oxide-precursor to convert the oxide-precursor to oxide, producing an oxide composite material wherein multiple sacrificial particles are encompassed within the same oxide composite material;
selectively removing the sacrificial template particles without dissolution of the oxide so as to produce a porous oxide support; and
attaching or depositing a platinum group metal, non-platinum group metal, or alloy thereof to the surface of the porous oxide support.

15. The method of claim 14 wherein the sacrificial particles are irregularly shaped.

* * * * *